US006222482B1

United States Patent
Gueziec

(10) Patent No.: US 6,222,482 B1
(45) Date of Patent: Apr. 24, 2001

(54) HAND-HELD DEVICE PROVIDING A CLOSEST FEATURE LOCATION IN A THREE-DIMENSIONAL GEOMETRY DATABASE

(75) Inventor: Andre Gueziec, Mamaroneck, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,929

(22) Filed: Jan. 29, 1999

(51) Int. Cl.[7] .................................................. H04B 7/185
(52) U.S. Cl. ............................... 342/357.08; 342/357.06; 342/458; 701/213
(58) Field of Search ........................ 342/357.08, 357.06, 342/419, 458, 118; 701/213

(56) References Cited

U.S. PATENT DOCUMENTS

| | | |
|---|---|---|
| 5,289,195 | 2/1994 | Inoue . |
| 5,381,338 | 1/1995 | Wysocki et al. . |
| 5,470,233 * | 11/1995 | Fruchterman et al. .............. 434/112 |
| 5,699,244 | 12/1997 | Clark, Jr. et al. . |
| 5,781,150 | 7/1998 | Norris . |
| 5,959,568 * | 9/1999 | Woolley ................................. 342/42 |
| 6,023,278 * | 2/2000 | Margolin ............................... 345/419 |

OTHER PUBLICATIONS

A. Gueziec, Surface Simplification with Variable Tolerance, Proceedings of the Second International Symposium on Medical Robotics & Computer Assisted Surgery, MRCAS '95, Baltimore, MD Nov. 4–7, 1995.

Yi–Jen Chiang and Roberto Tamassia, Dynamic Algorithms in Computational Geometry, Proceedings of the IEEE, vol. 80, No. 9, Sep. 1992, pp. 1412–1434.

Mark Bradshaw, et al., System and method for collecting data used to form a geographic information system database (US5528518), http://www.patents.ibm.com.

Gabriel Taubin, et al., YO997–438, 14 sheets drawings.

* cited by examiner

Primary Examiner—Thomas H. Tarcza
Assistant Examiner—Dao L. Phan
(74) Attorney, Agent, or Firm—Louis J. Percello; F. Chau & Associates, LLP

(57) ABSTRACT

A hand-held device has access to a three-dimensional geometry database and a GPS receiver, and provides information on the one or more closest features to the device location in the three-dimensional geometry database. The system has data input devices, optionally digital cameras, and a data processor executing a location process. A multiresolution process creates one or more models of the three-dimensional geometry database. The models have a hierarchy of resolutions. The models have vertices, edges and polygons. The multiresolution process preferably associates data to the vertices, edges and polygons. A data processor executes a location process that determines a distance between the position of the hand-held device and corresponding one or more closest features on the hierarchy of resolutions of the database. The data processor produces display commands for displaying data and geometry relative to the one or more closest features. Data input devices are used to collect data that is appended to or replaces data pertaining to the one or more closest features.

12 Claims, 4 Drawing Sheets

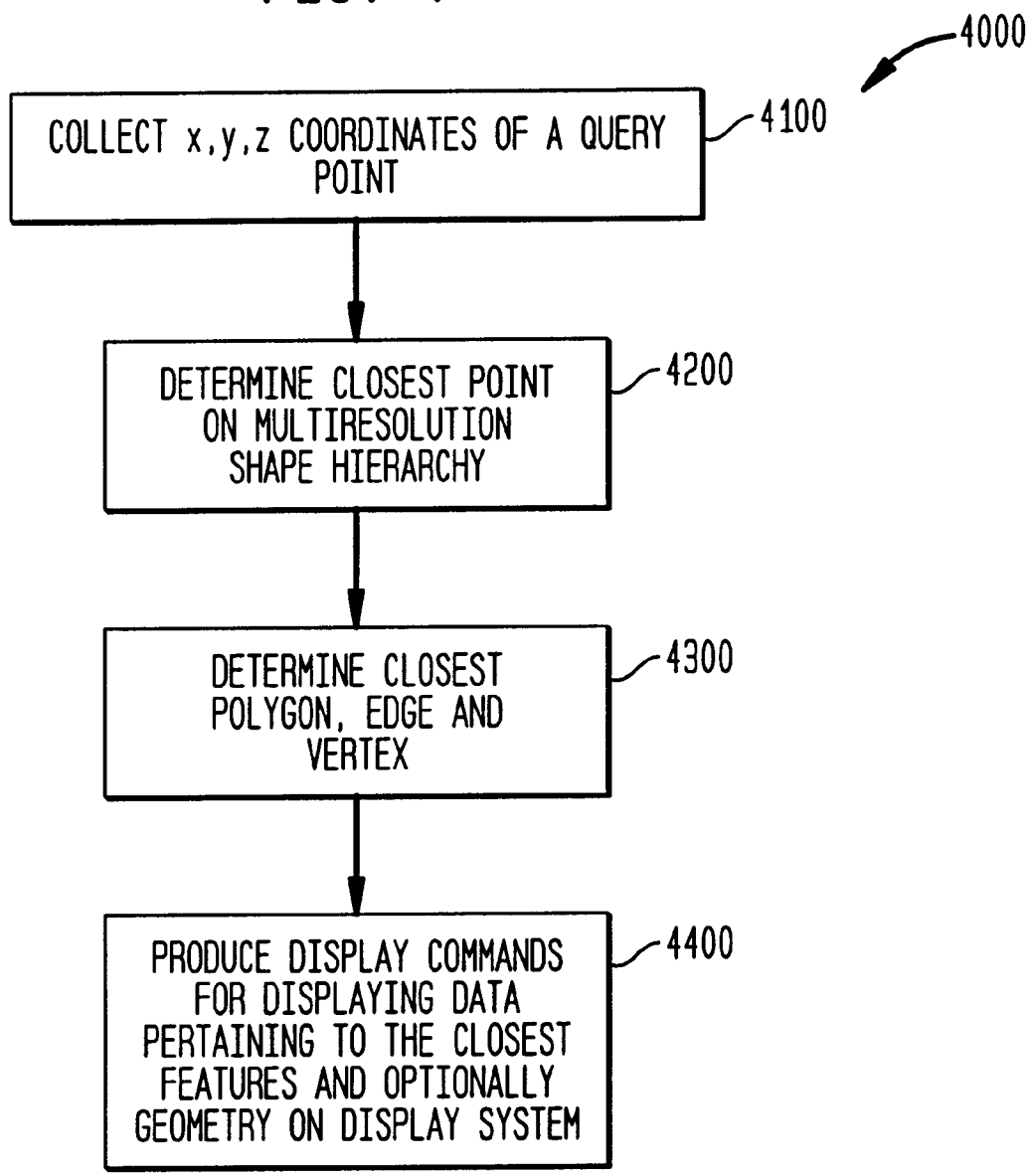

US 6,222,482 B1

HAND-HELD DEVICE PROVIDING A CLOSEST FEATURE LOCATION IN A THREE-DIMENSIONAL GEOMETRY DATABASE

This patent application is related to U.S. patent application Ser. No. 09/236,688, entitled "SYSTEM AND METHOD FOR FINDING THE DISTANCE FROM A MOVING QUERY POINT TO THE CLOSEST POINT ON ONE OR MORE CONVEX OR NON-CONVEX SHAPES", by A. Gueziec, which is herein incorporated by reference in its entirety.

FIELD OF THE INVENTION

This invention relates generally to geometry databases, geographic information systems, hand-held devices and the Global Positioning System (GPS), and in particular, to a hand-held device having access to a three-dimensional geometry database and a GPS receiver, and providing information on one or more closest features to the device location in the three-dimensional geometry database, and optionally displaying the geometry information surrounding the one or more closest features in the three-dimensional geometry database on a display system used in conjunction with the hand-held device.

BACKGROUND OF THE INVENTION

Hand-held computers and personal assistants such as the 3Com PalmPilot (PaImPilot is a trademark of 3Com Corporation) are rapidly improving in performance, allowing to execute such applications as word processing, diaries, database access and management. An example of database management software is the program List version 0.93 by Andrew Low, which can be installed and operated on a 3Com PaImPilot computer.

Portable GPS receivers are being used for a variety of applications that query a database using the current location of the GPS receiver, to obtain various information dependent upon the location of the GPS receiver and time. An example of use of a GPS receiver for obtaining information dependent upon the location of the device is the Hertz NeverLost system (NeverLost is a trademark of the Hertz Corporation), used in combination with a motor vehicle to instruct the driver of the proper directions to reach a specific destination.

In the prior art, GPS receivers are used to collect data to form a database. An example of use of a GPS receiver to collect data to form or complete a database is provided in U.S. Pat. No. 5,699,244 entitled HAND-HELD GUI PDA WITH GPS/DGPS RECEIVER FOR COLLECTING AGRONOMIC AND GPS POSITION DATA by Clark et al., that is herein incorporated by reference in its entirety. Clark et al. 's device comprises a probe used to collect coordinates of objects of interest in the vicinity of the device.

One example of database is a geographic database or Geographic Information System (GIS). One system for collecting data to form a geographic database is described in U.S. Pat. No. 5,528,518 entitled SYSTEM AND METHOD FOR COLLECTING DATA USED TO FORM A GEOGRAPHIC INFORMATION SYSTEM DATABASE by Bradshaw et al., which is herein incorporated by reference in its entirety. Using the system described by Bradshaw et al., a variety of devices can be used to collect the data.

Location data as provided by a GPS receiver is also used to query a geometry database and collect geometric data used to display three-dimensional renderings of the surroundings of the spatial location specified in the location data. A three-dimensional geometry database typically comprises vertices which are connected by polygons or triangles and edges. For a more detailed description, see U.S. patent application Ser. No. 006,771 entitled COMPRESSED REPRESENTATION OF CHANGING MESHES AND METHOD TO DECOMPRESS, filed Jan. 14, 1998 by G. Taubin and A. Gueziec, U.S. patent application Ser. No. 023,757, entitled PROGRESSIVE MULTI-LEVEL TRANSMISSION AND DISPLAY OF TRIANGULAR MESHES by A. Gueziec, G. Taubin and F. Lazarus, and U.S. patent application Ser. No. 976,247 entitled PROGRESSIVE COMPRESSION OF CLUSTERED MULTI-RESOLUTION POLYGONAL MODELS all of which are herein incorporated by reference in their entirety, as well as U.S. Patent Application XXX, entitled SYSTEM AND METHOD FOR FINDING THE DISTANCE FROM A MOVING QUERY POINT TO THE CLOSEST POINT ON ONE OR MORE CONVEX OR NON-CONVEX SHAPES, and previously incorporated by reference.

A query point is a point for which it is sought to compute the distance and one or more closest features on the geometry database. A closest feature is either a point, edge or polygon. A query point generally has one closest polygon, one closest edge and one closest vertex on the geometry database. An example of a system providing access to a three-dimensional geometry database and displaying three-dimensional renderings is described in U.S. Pat. No. 5,381,338 entitled REAL TIME THREE DIMENSIONAL GEO-REFERENCED DIGITAL ORTHOPHOTOGRAPH-BASED POSITIONING, NAVIGATION, COLLISION AVOIDANCE AND DECISION SUPPORT SYSTEM by Wysocki et al., which is herein incorporated by reference in its entirety.

In U.S. Pat. No. 5,781,150 entitled GPS RELATIVE POSITION DETECTION SYSTEM, by Norris et al., which is herein incorporated by reference in its entirety, a device is used for displaying the geographical location of the device with respect to another object and providing an approximate direction of travel and distance to the object from the device.

In U.S. Pat. No. 5,289,195 entitled POSITIONING AND DISPLAYING SYSTEM by Inoue et al., which is herein incorporated by reference in its entirety, an apparatus is described for locating a current position on a map.

Chiang et al., in the publication entitled "Dynamic Algorithms in Computational Geometry" in Proceedings of the IEEE, Vol 80. No. 9, September 1992, pages 1412–1434, which is herein incorporated by reference in its entirety, describe a method for locating a point in a planar triangulation using data structures representing two-dimensional trees.

PROBLEMS WITH THE PRIOR ART

None of the methods and devices of the prior art allow to determine the one or more closest features to a query point on a three-dimensional geometry database, to retrieve information pertaining to the one or more closest feature and optionally display the information pertaining to the one or more closest features in the three-dimensional geometry database and other pictorial representations of the geometry surrounding the one or more closest features in the three-dimensional geometry database.

The Chiang et al. method provides a closest feature to a query point in a two-dimensional database consisting of a planar triangulation, but does not easily generalize to a triangulation that is not planar in a three-dimensional database;

The Inoue et al. apparatus allows to locate a position on a two-dimensional map but does not easily generalize to locating a closest feature in a three-dimensional geometry database.

The Norris et al. device displays the position of an object with respect to the device in two dimensions, but does not permit displaying data pertinent to the object, nor displaying a three-dimensional configuration of a query point in relative position to polygons, vertices and edges of a three-dimensional geometry database.

The Wysocki et al. system is primarily intended for use on a moving vehicle to prevent collisions, and provides pictorial information corresponding to the current position and geographic surroundings of the vehicle. The Wysocki et al. system cannot be used to retrieve and display data associated with polygons, vertices and edges of a three-dimensional geometry database.

The Bradshaw et al. system is primarily intended for collecting data and does not permit to display information retrieved from the geometry database.

Finally, the Clark et al. system can collect and display two-dimensional data, but cannot be easily generalized for collecting or displaying three-dimensional data of a three-dimensional geometry database.

OBJECTS OF THE INVENTION

An object of this invention is a mobile device providing information on the closest feature in a three-dimensional geometry database.

Another object of this invention is a multiresolution three-dimensional geometry database system associating data to polygons, edges and vertices of a multiresolution three-dimensional geometry database.

Another object of this invention is an improved process for providing the closest feature in a three-dimensional geometry database.

SUMMARY OF THE INVENTION

The present invention is a hand-held device having access to a three-dimensional geometry database and a GPS receiver and providing information on the one or more closest features to the device location in the three-dimensional geometry database, and optionally displaying the geometry information surrounding the one or more closest features in the three-dimensional geometry database on a display system.

The system has data input devices, optionally digital cameras, and a data processor executing a location process.

The GPS receiver is used to collect x, y, z coordinates of the position of the hand-held device and accurate time corresponding to the position.

A multiresolution process creates one or more models of a three-dimensional geometry database. The models have a hierarchy of resolutions. The models have vertices, edges and polygons. The multiresolution process preferably associates data to the vertices, edges and polygons.

A data processor executes a location process that determines a distance between the position of the hand-held device and corresponding one or more closest features on the hierarchy of resolutions of the database. The data processor produces display commands for displaying data relative to the one or more closest features, and optionally geometry relative to the vicinity of the one or more closest features.

Data input devices are used for collecting data that is appended by the data processor to data pertaining to the one or more closest features and optionally replaces data pertaining to the one or more closest features in the three-dimensional geometry database.

BRIEF DESCRIPTION OF THE DRAWINGS

FIG. 4 is a flow chart showing an overview of a process for finding one or more closest features in a geometry database and displaying data pertaining to the closest point feature.

DETAILED DESCRIPTION OF THE INVENTION

The present invention is a system and device receiving GPS signals, determining the position of the device using GPS signals, having access to a three-dimensional geometry database that has data associated with polygons, edges and vertices, determining the closest polygon, edge and vertex to the position of the device, displaying data associated with the closest polygon, edge, and vertex and the vicinity of the closest polygon, edge, and vertex, and allowing to change the data or add data in the database.

The present invention is particularly useful when the three-dimensional geometry database contains data that cannot be accurately represented with a two-dimensional geometry database. For instance the present invention could be used in conjunction with a geology database containing information pertaining to a mountainous (and highly non-planar) terrain. The present invention could also be used in conjunction with an architectural database representing a complex building or set of buildings. The three-dimensional geometry database has data associated with polygons, edges and vertices. The data can be of various types: data that can be described as text such as type of vegetation or fauna, type of rock or soil, data indicating the presence of various minerals, data of a oil field, heights and sizes of buildings, proximity of roads, railways, or paths etc.; multimedia data such as digital images or video data, sound data, etc.

Figure 1:
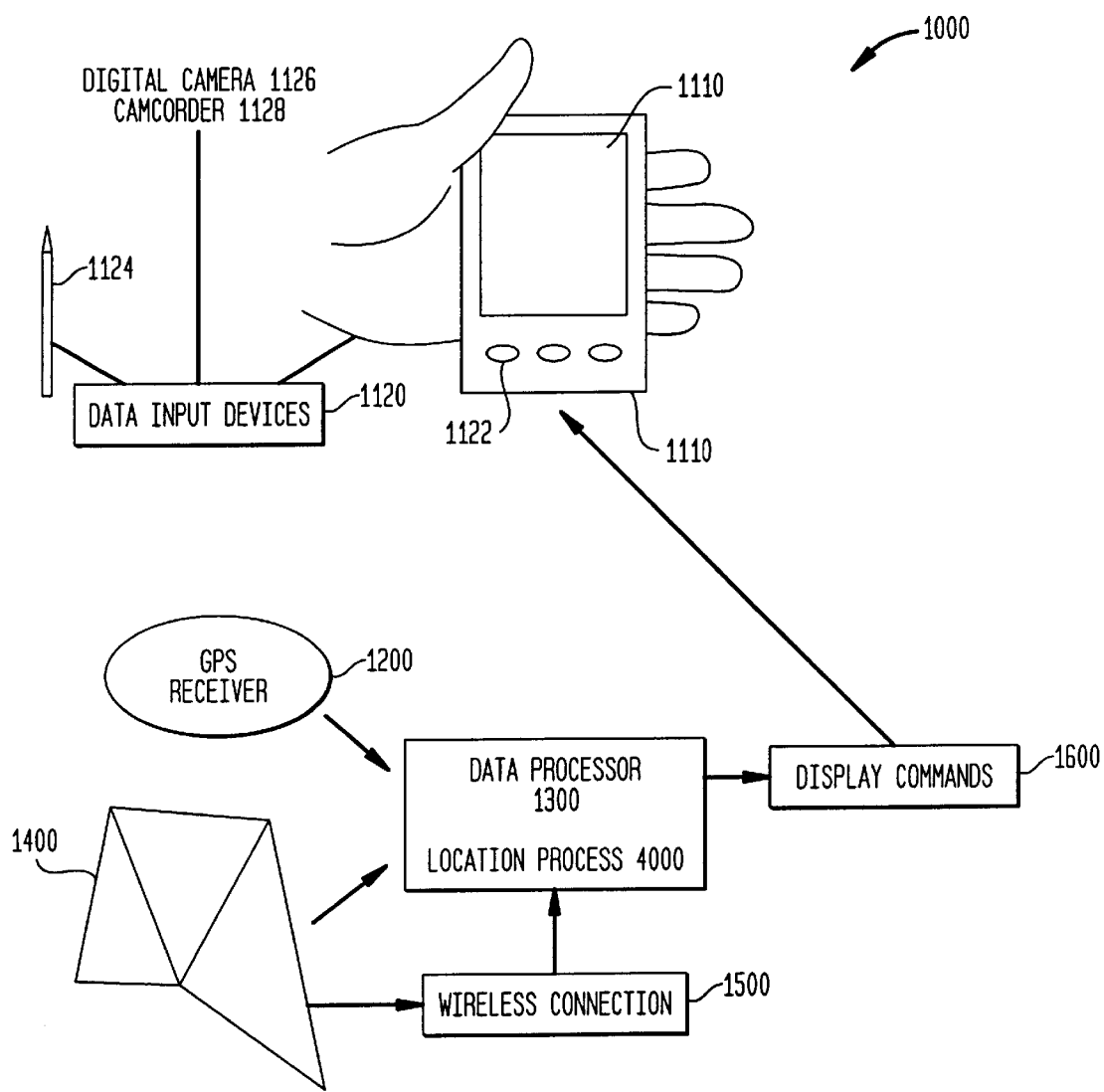
FIG. 1 is a block diagram of one preferred embodiment of the present system.

Referring to FIG. 1, a mobile system 1000 comprises a hand-held device 1100, the device 1100 comprising a display system 1110, and optional data input devices 1120. Data input devices 1120 may comprise one or a plurality of buttons 1122, a stylus 1124, a digital camera 1126 or a digital camcorder 1128. The mobile system 1000 also comprises any known GPS receiver 1200 for obtaining x,y, and z coordinates of the location of the hand-held device 1100. In a preferred embodiment of the system 1000, the GPS receiver 1200 is incorporated in the hand-held device 1100. The mobile system 1000 has also access to a geometry database 1400. In one preferred embodiment of the system 1000, the geometry database 1400 is accessed using a wireless connection 1500. In another embodiment of the system 1000, the geometry database 1400 is resident in a memory of the hand-held device 1100. The mobile system 1000 also comprises a data processor 1300, executing a location process 4000 for providing information on the closest features to the location of the hand-held device 1100. The location process 4000 which is explained below preferably uses multiresolution closest points queries as described in U.S. patent application Ser. No. 09/236,688 entitled SYSTEM AND METHOD FOR FINDING THE DISTANCE FROM A MOVING QUERY POINT TO THE CLOSEST POINT ON ONE OR MORE CONVEX OR NON-CONVEX SHAPES, and previously incorporated by reference. The data processor 1300 optionally sends display commands 1600 to the display system 1110 of the hand-held device 1100.

Figure 2:
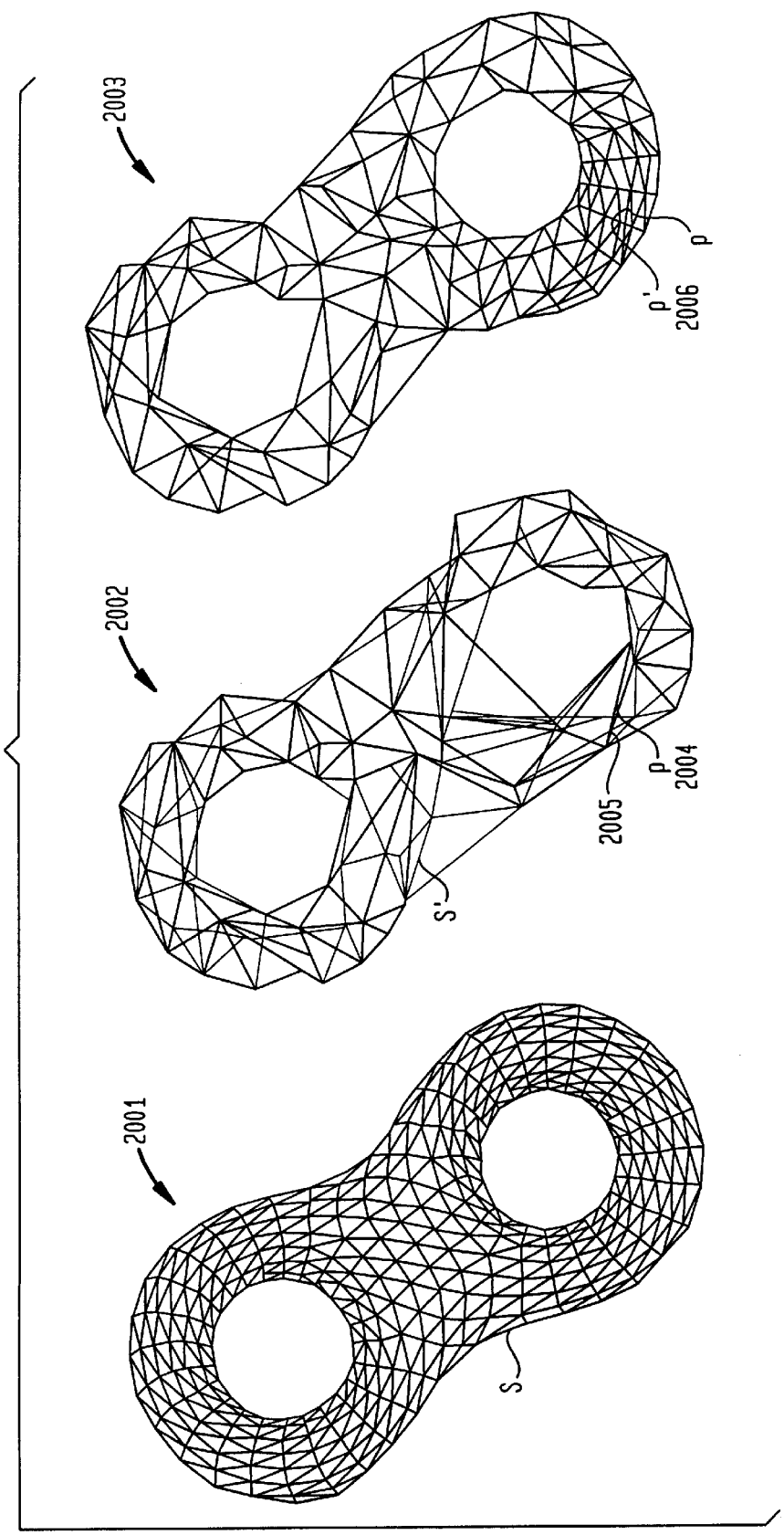
FIG. 2 is a diagram showing a model that is a part of a multiresolution three-dimensional geometry database with a hierarchy of three resolutions, a query point, and a closest point on the model of the database.

Further understanding of the operation of the multiresolution closest-point queries of this invention may be achieved with reference to FIG. 2. A three-dimensional database comprises one or a plurality of three-dimensional shapes. Referring to FIG. 2, a a three-dimensional shape 2001 is shown with a hierarchy of three resolutions. A simplified, or low resolution representation 2002 as shown in FIG. 2 can be produced as taught in the prior art (see for instance the article by A. Gueziec entitled "Surface Simplification with Variable Tolerance" in Proceedings of the Second Annual Symposium on Medical Robotics and Computer Assisted Surgery published by Wiley, New York, pages 132–139, which is herein incorporated by reference in its entirety). Considering a query point 2004, an approximate closest point 2005 is determined on the low resolution shape 2002, which contains fewer triangles than shape 2001. Upon examining the distances to the triangles of the low resolution shape 2002, a process as described in U.S. patent application Ser. No. 09/236,688 entitled SYSTEM AND METHOD FOR FINDING THE DISTANCE FROM A MOVING QUERY POINT TO THE CLOSEST POINT ON ONE OR MORE CONVEX OR NON-CONVEX SHAPES, and previously incorporated by reference, selectively refines the low resolution shape 2002 by inserting triangles in the vicinity of the approximate closest point 2005, and obtains a refined shape 2003. A closest point 2006 from the query point 2004 is then determined on the refined shape 2003.

Figure 3:
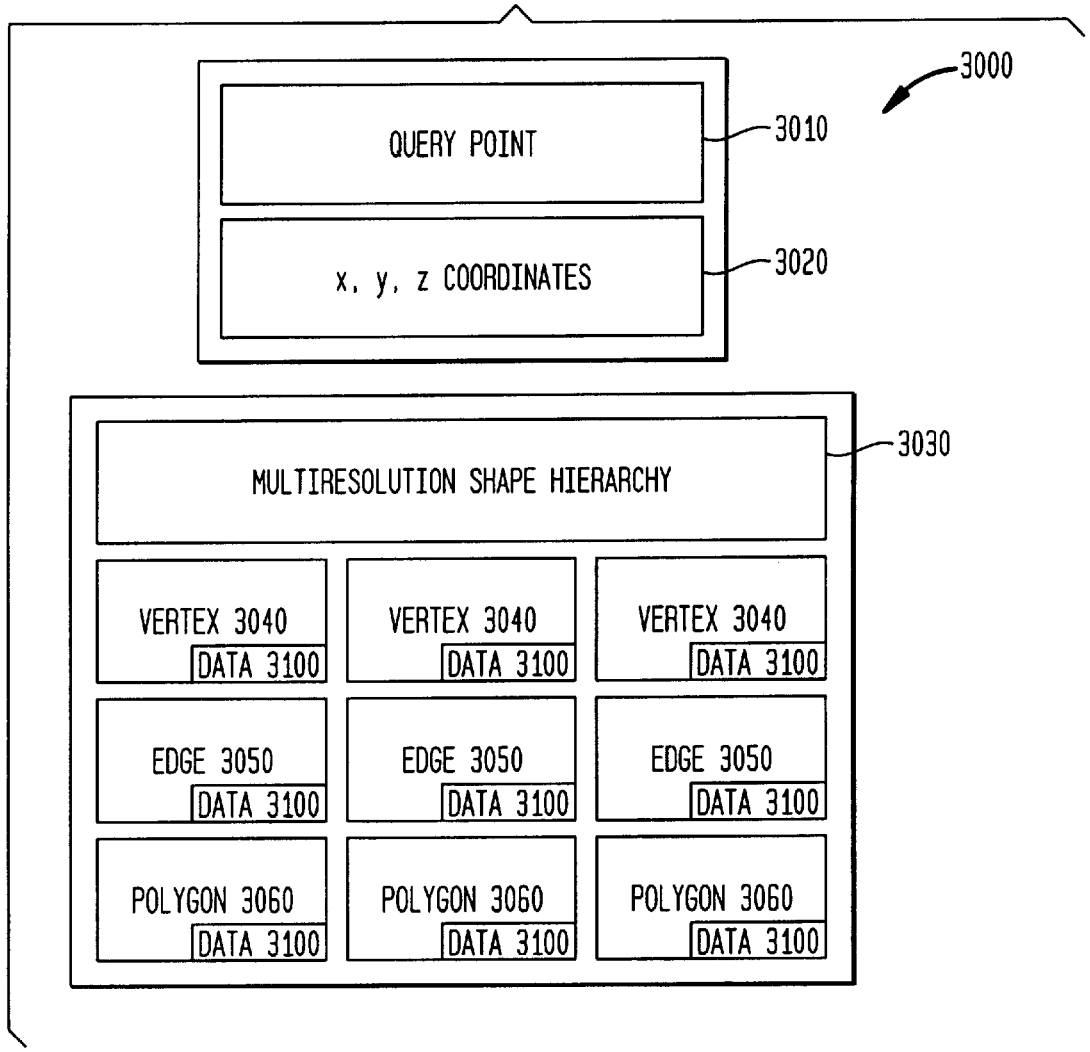
FIG. 3 is a block diagram of data structures used by the present invention.

The location process 4000 can be further understood by studying the data structures used with reference to FIG. 3. Referring to FIG. 3, the present invention uses a data structure representing a query point 3010, and an array representing three-dimensional x,y, z coordinates 3020 of the query point 3010. The present invention also uses a multiresolution shape hierarchy 3030 comprising a plurality of vertices 3040, edges 3050 and polygons 3060. Vertices 3040, edges 3050 and polygons 3060 optionally have associated data 3100. Given this disclosure and the incorporated references one skilled in the art can implement these or equivalent data structures.

Referring to FIG. 4, the location process 4000 begins by collecting x, y and z coordinates 3020 of a query point 3010 in Step 4100. Then, in Step 4200, the process 4000 determines the closest point 2006 to the query point 3010 on the multiresolution shape hierarchy 3030 of the multiresolution geometry database 1400. Determining the closest point is preferably accomplished by solving a multiresolution closest-point query as explained in U.S. patent application Ser. No. 09/236,688 previously incorporated by reference. Then, closest features (polygon 3060, edge 3050 and vertex 3040) to the query point 3010 on the multiresolution shape hierarchy 3030 of the multiresolution geometry database 1400 are determined in Step 4300. Using multiresolution closest-point queries, the closest polygon to the query point 3010 is determined as the polygon containing the closest point 2006. Closest vertices and edges are then preferably determined by examining vertices and edges belonging to the closest polygon and choosing the closest ones. Then, in Step 4400, the process 4000 produces display commands for displaying data 3100 pertaining to the closest features and optionally geometry pertaining to the closest features on the display system 1110.

In another embodiment of the present invention, the present system can be used to collect data to be inserted in the multiresolution three-dimensional geometry database 1400, in addition to retrieving data from the multiresolution three-dimensional geometry database 1400. Such data can be text data inputted using a stylus 1124 or data chosen from a set of available data using one or more buttons 1122, or image data collected with a camera 1126, or video data collected with a camcorder 1128, or other text, sound, image, video, or three-dimensional geometry data that can be collected with a variety of devices.

I claim:

1. A device for determining one or more closest features to a query point represented in a three dimensional geometry database, the device comprising:

a receiver that receives and processes three or more GPS signals from three or more orbiting GPS satellites and determines three dimensional coordinates of the query point;

a memory read function that accesses the three-dimensional geometry database having a plurality of models forming a hierarchy of resolutions, each model having one or more polygons, one or more edges, and one or more vertices associated with reference locations, wherein each polygon, edge and vertex includes associated data; and a data processor for executing a location process to locate one or more of the reference locations that are closest to the query point.

2. A device, as in claim 1, wherein the device displays the associated data of the one or more reference locations that are closest to the query point.

3. A device, as in claim 1, where the one or more of the associated data includes following: data that can be described as text such as type of vegetation or fauna, type of rock or soil, data indicating the presence of various minerals, data of a oil field, heights and sizes of buildings, proximity of roads, railways, or paths; multimedia data such as digital images or video data, sound data.

4. A device, as in claim 1, where the data processor further receives input data from data input devices and uses the input data to edit the three-dimensional geometry database.

5. A device, as in claim 1, where the one or more and closest features are determined by a multi-resolution process.

6. A process for locating one or more closest features relative to a query point on a three-dimensional geometry database, the process comprising the steps of:

determining three-dimensional coordinates of the query point using a device having a receiver for receiving and processing three or more GPS signals from three or more orbiting GPS satellites;

accessing a three-dimensional geometry database comprised of a plurality of models, each model including one or more polygons, one or more edges, and one or more vertices, wherein each polygon, edge and vertex includes associated data; and determining a closest polygon, a closest edge, and a closest vertex to the query point using a data processor for executing a location process.

7. A process, as in claim 6, further comprising the step of displaying the data associated with the closest polygon, edge and vertex.

8. A process, as in claim 7, further comprising the step of modifying the data associated with the closest polygon, edge and vertex.

9. A process, as in claim 6, where the data associated with polygons, edges and vertices is added data.

10. A program storage device readable by a machine, tangibly embodying a program of instructions executable by the machine to perform the method steps for providing information on one or more closest features relative to a query point, the method comprising the steps of:

determining three-dimensional coordinates of the query point using a receiver for receiving and processing three or more GPS signals from three or more orbiting GPS satellites;

accessing a three-dimensional geometry database comprised of a plurality of models, each model including one or more polygons, one or more edges, and one or more vertices, wherein each polygon, edge and vertex includes associated data; and determining a closest polygon, a closest edge, and a closest vertex to the query point using a data processor for executing a location process.

11. The device of claim 1, wherein the query point is a physical location.

12. The device of claim 1, wherein the query point is a location of the device.

* * * * *